(12) United States Patent
Monti (10) Patent No.: US 7,374,033 B2
(45) Date of Patent: May 20, 2008

(54) METHOD FOR TRANSFERRING ARTICLES FROM A FIRST CONVEYING LINE TO A SECOND CONVEYING LINE AND AN APPARATUS FOR CARRYING OUT THE METHOD

(75) Inventor: Giuseppe Monti, Pianoro (IT)

(73) Assignee: Marchesinl Group S.p.A., Pianoro (Bologna) (IT)

( * ) Notice: Subject to any disclaimer, the term of this patent is extended or adjusted under 35 U.S.C. 154(b) by 96 days.

(21) Appl. No.: 11/390,638

(22) Filed: Mar. 28, 2006

(65) Prior Publication Data

US 2006/0219523 A1    Oct. 5, 2006

(30) Foreign Application Priority Data

Mar. 30, 2005   (IT) .......................... BO2005A0201

(51) Int. Cl.
    *B65G 47/26*   (2006.01)
(52) U.S. Cl. ...................................... 198/432; 198/429

(58) Field of Classification Search ................ 198/400, 198/412, 429, 432, 456, 598
See application file for complete search history.

(56) References Cited

U.S. PATENT DOCUMENTS

| 5,381,884 | A | | 1/1995 | Spatafora et al. |
| 5,860,427 | A | * | 1/1999 | Stivani et al. ........... 198/418.3 |
| 6,105,750 | A | * | 8/2000 | Belvederi .................... 198/432 |
| 7,070,039 | B2 | * | 7/2006 | Dombek ..................... 198/432 |
| 7,165,668 | B2 | * | 1/2007 | Dombek .................. 198/459.8 |

FOREIGN PATENT DOCUMENTS

| GB | 1375703 | 11/1974 |
| WO | WO 00/68086 | 11/2000 |

* cited by examiner

*Primary Examiner*—James R Bidwell
(74) *Attorney, Agent, or Firm*—William J. Sepone; Coleman Sudoi Sapone P.C.

(57) ABSTRACT

A transferring apparatus carries out the method proposed by the invention, for transferring articles from a first conveying line to a second article conveying line by two manipulating members, operated independently from each other to pick up a corresponding pair of articles moving on the first conveying line, and to release them onto the second conveying line arranged at an angle with respect to a picking up configuration.

20 Claims, 6 Drawing Sheets

METHOD FOR TRANSFERRING ARTICLES FROM A FIRST CONVEYING LINE TO A SECOND CONVEYING LINE AND AN APPARATUS FOR CARRYING OUT THE METHOD

FIELD OF THE INVENTION

The present invention relates to automatic packaging of articles, in particular pharmaceuticals, cosmetics and/or food.

More in detail, the present invention relates to a method for transferring articles from a first conveying line to a second article conveying line, for example for feeding a boxing machine. Moreover, the invention relates to an apparatus for carrying out the method.

BACKGROUND OF THE INVENTION

Known transferring apparatuses include manipulating means for picking up articles from a first conveying line, where they are placed within respective compartments or in bulk, and for moving them into corresponding boxes of a second conveying line, for feeding a boxing machine.

The manipulating means, moving along two or three axes, usually include arms, whose ends carry means for picking up/releasing the articles.

In case that the first conveying line is operated continuously, the arm follows the line keeping in registry with an article, then picks it up and subsequently releases it into a compartment of the second conveying line.

In case that the first conveying line is operated stepwise, the article is released into the compartment preferably during a dwelling, while in case of continuous operation, a two-step following motion is necessary, keeping in registry with the compartment first and subsequently releasing the article.

There are also manipulating means including two arms, acting onto each other or connected mechanically to each other, with corresponding article picking up means situated at their ends.

The main problem of the known transferring apparatuses derives from the limited production rate, which they can achieve in the system, incompatible with high standards, required at present by the market.

Another disadvantage of the known apparatuses lies in their insufficient flexibility during the article picking up/release, as far as possible changes of pace and/or of picking up/release configuration are concerned, as well as the change of articles size.

SUMMARY OF THE INVENTION

The object of the present invention is to propose a method for transferring articles, in particular pharmaceuticals, cosmetics and/or food, from a first conveying line to a second article conveying line, which ensures high production rate and flexibility standards during the operation, independently from the article size, and from the configuration and/or the article picking up/release pace.

Another object of the present invention is to propose a method for transferring articles, which is distinguished by particularly rapid and easy to understand operation steps, which ensures high reliability standards in any production stage.

A further object of the present invention is to propose an apparatus for carrying out the above method, which ensures high flexibility and versatility standards in any operation condition, allowing particularly rapid and easy adapting operations, required by the article size and/or step change.

Yet a further object of the present invention is to propose an extremely functional apparatus, which ensures particularly rapid and easy installation and maintenance operations.

The above mentioned objects are obtained, in accordance with the contents of the claims, by a method for transferring articles from a first conveying line to a second article conveying line, including:

placing at least two manipulating members near and above said first conveying line;

operating each of said manipulating members to follow the first conveying line with a relative substantially zero speed;

operating each of the two manipulating members to pick up a corresponding pair of articles carried by the first conveying line in a picking up step;

placing each of the two manipulating members near and above the second conveying line;

operating each of the two manipulating members to follow the second conveying line with a relative substantially zero speed;

operating each of the two manipulating members to release the corresponding pair of articles onto the second conveying line in a release step;

with said at least two manipulating members operated independently from each other in the above placing, following, picking up and release steps.

According to the invention, an apparatus is claimed for transferring articles from a first conveying line to a second article conveying line, the apparatus including:

at least two manipulating members for picking up a pair of articles moving along the first conveying line, in a picking up step, and for releasing the picked up pair of articles onto the second conveying line, in a release step and arranged at an angle with respect to the picking up step; said at least two manipulating members being operated independently from each other.

BRIEF DESCRIPTION OF THE DRAWINGS

The characteristic features of the invention are pointed out in the following description of some preferred but not exclusive embodiments, with reference to the enclosed figures, in which.

DISCLOSURE OF THE PREFERRED EMBODIMENTS

Figure 1:
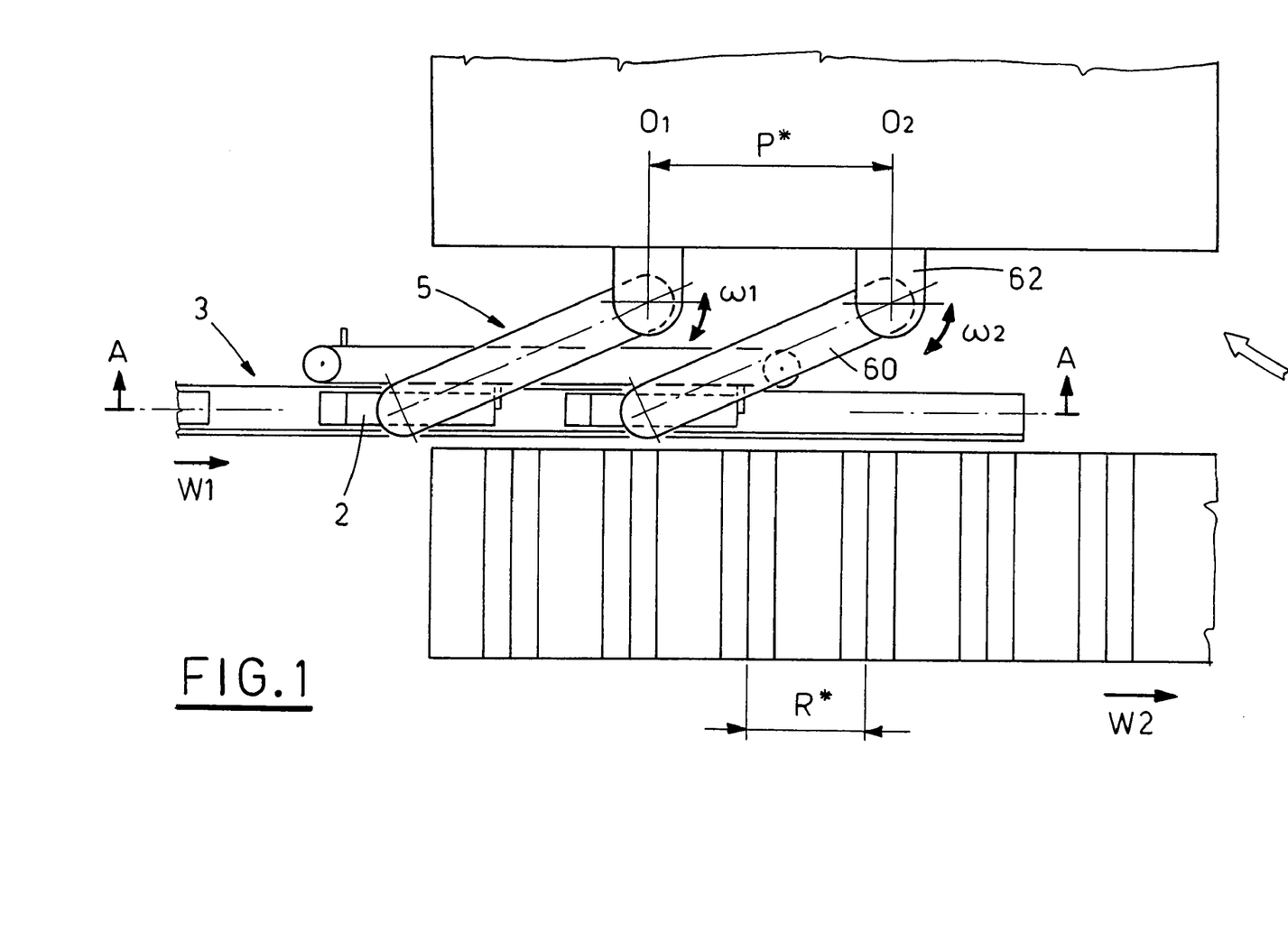
FIGS. 1, 2, 3, 4 are as many schematic, top views of the proposed apparatus in relative operation steps of the method proposed by the invention.
Figure 2:
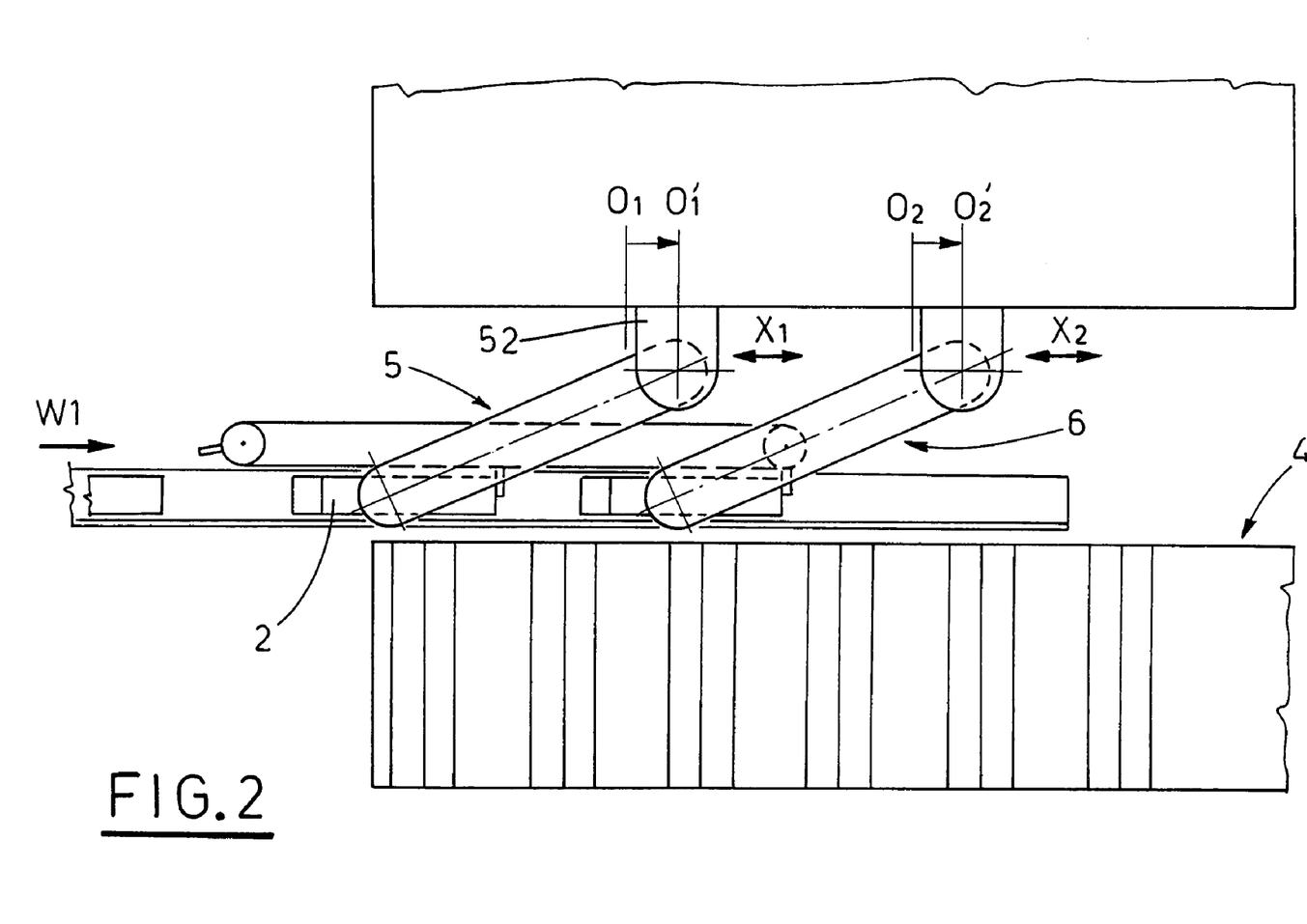
Figure 2A:
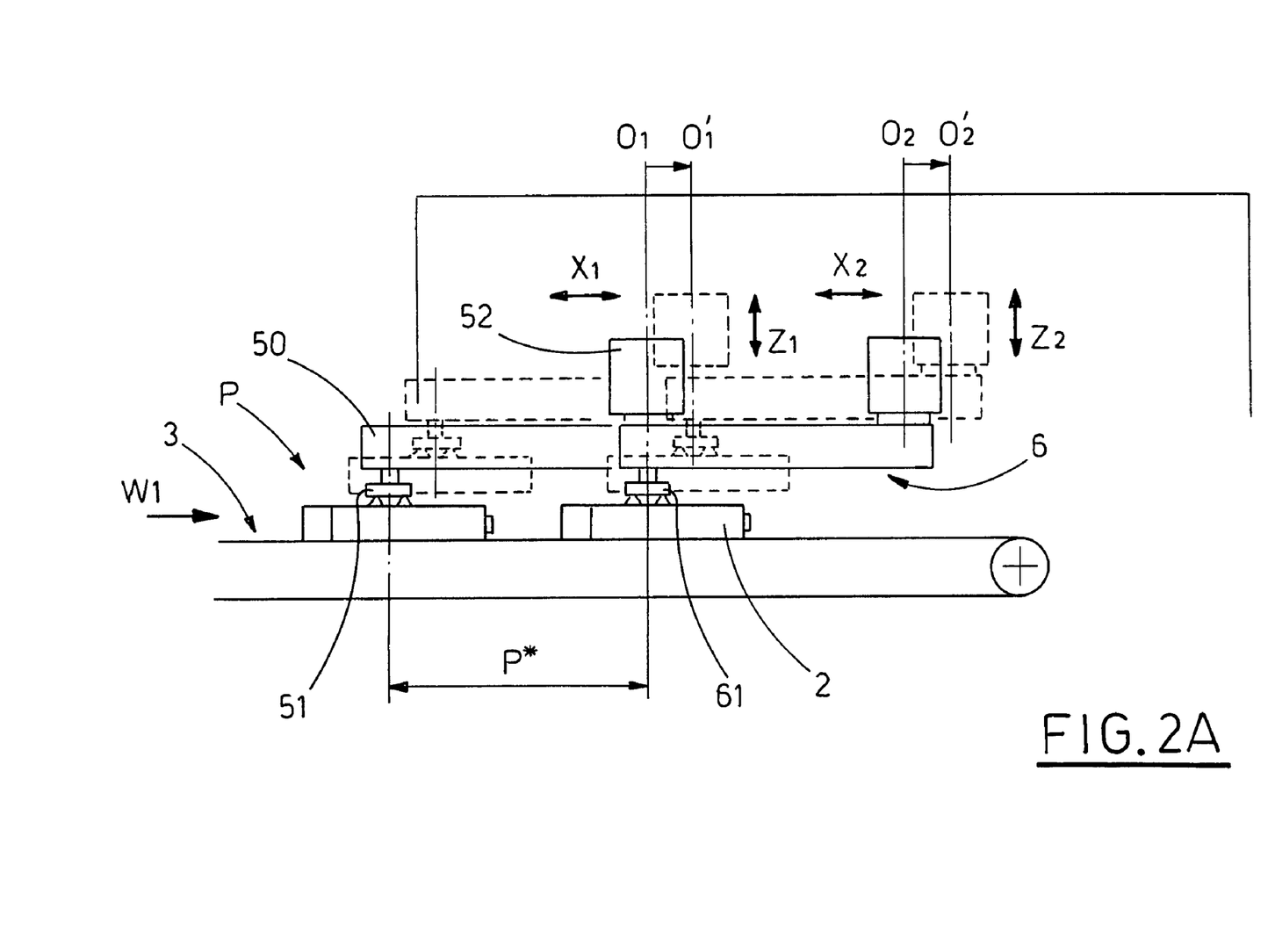
FIG. 2A is a schematic, lateral view of the apparatus, taken along the line A-A indicated in FIG. 1.
Figure 3:
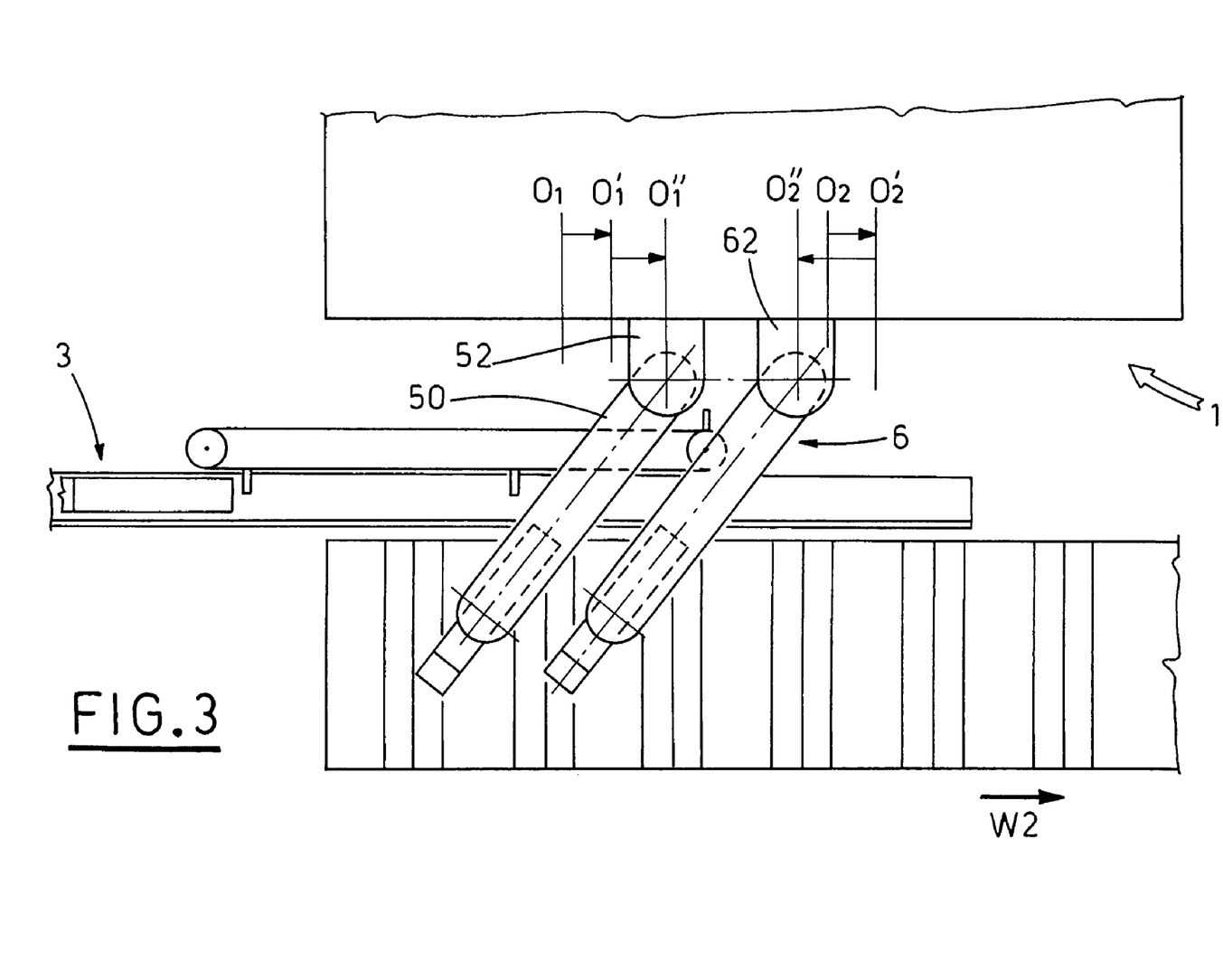
Figure 4:
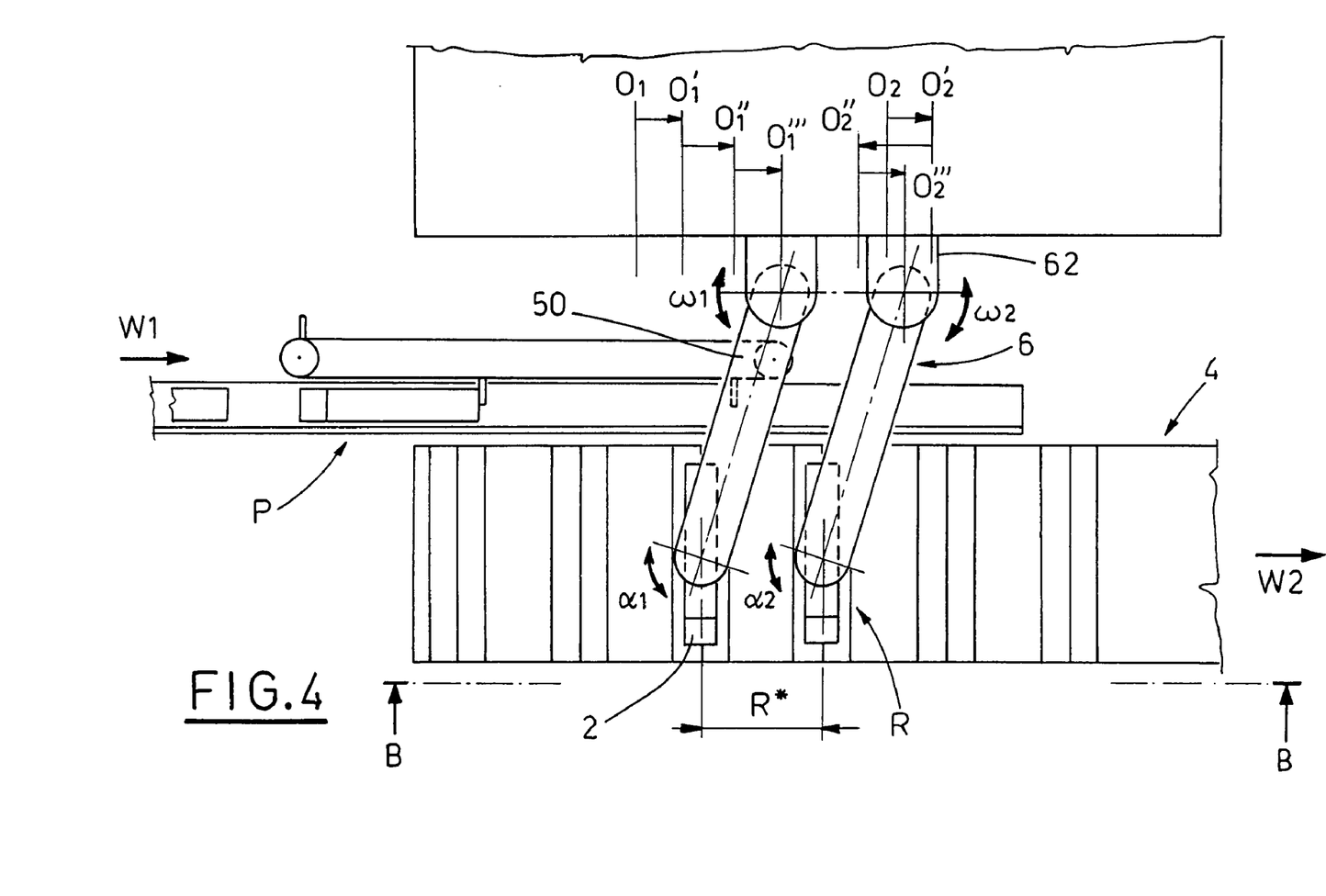
Figure 4A:
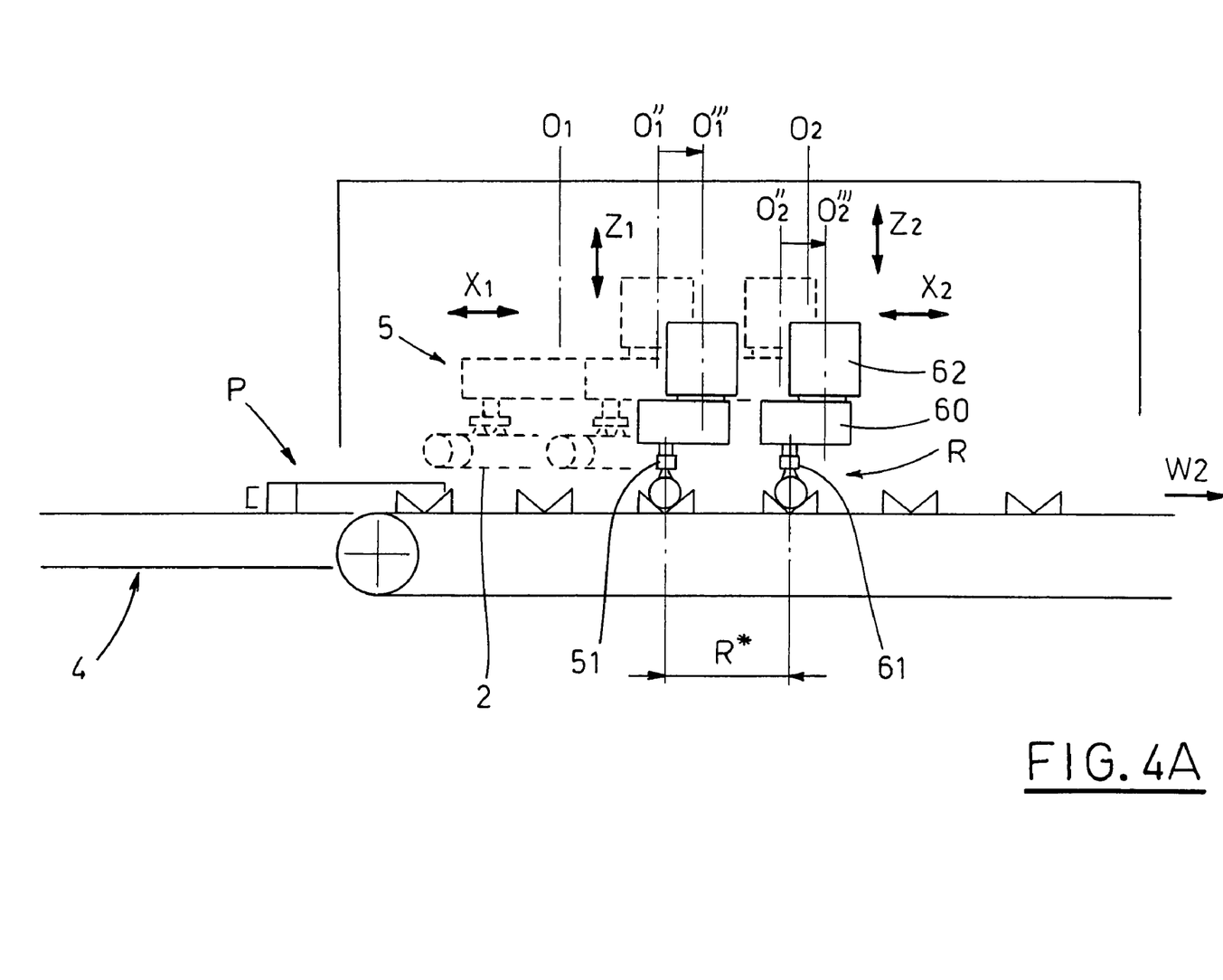
FIG. 4A is a schematic, lateral view of the apparatus, taken along the line B-B indicated in FIG. 4.

With reference to above described Figures, the general reference number 1 indicates the proposed apparatus, which carries out the method proposed by the invention, for transferring articles 2, e.g. rigid and/or squeezable tubes, from a first conveying line 3 to a second article conveying line 4.

As a mere example, the articles 2 in the first conveying line 3 are longitudinally aligned and are released to the second conveying line 4 arranged longitudinally side by side.

The lines, first 3 and second 4, are considered situated side by side and operated in the same forward direction $W_1$, $W_2$.

The first conveying line 3 is preferably operated continuously, while the second conveying line 4 can be operated stepwise or continuously, the latter being preferred.

The transferring apparatus 1 includes at least two manipulating members 5, 6, operated independently from each other, in suitable step relation, to pick up a corresponding pair of articles 2, placed on the first conveying line 3, during a picking up step P*, and to release them in a position corresponding to the second conveying line 4, during a release step R*, in a release configuration R being angular with respect to the picking up configuration P, e.g. rotated by 90°.

The two manipulating members 5, 6 move preferably along at least four axes $[(x_1, \omega_1, \alpha_1, z_1), (x_2, \omega_2, \alpha_2, z_2)]$.

According to a preferred embodiment, shown in the enclosed figures, the manipulating members 5, 6 include relative arms 50, 60, each one having one end pivoted to corresponding support means 52, 62 and another end provided with means 51, 61 for picking up and/or releasing the articles 2.

The support means 52, 62 can translate horizontally ($x_1$, $x_2$) and/or vertically ($z_1$, $z_2$), respectively to follow the lines 3, 4 and to move to and from these lines 3, 4, during the article 2 picking up/releasing action.

The arms 50, 60 are pivoted to the corresponding support means 52, 62, so as to swing ($\omega_1$, $\omega_2$) with respect to relative vertical axes, and to allow their positioning near the lines 3, 4.

Likewise, the picking up means 51, 61 of the articles 2 are pivoted to the corresponding arms 50, 60, so as to swing ($\alpha_1$, $\alpha_2$) with respect to relative vertical axes, and to allow the articles 2 to be released in configuration R, angular with respect to the picking up configuration P, e.g. rotated by 90°.

During the articles 2 picking up/release action, the arms 50, 60 are operated, keeping e.g. coplanar, to move close to and/or far from each other.

The method, proposed by the invention, for transferring articles 2, e.g. rigid and/or squeezable tubes, from a first conveying line 3 to a second article conveying line 4, carried out by the proposed apparatus 1, includes the following operation steps:

placing at least two manipulating members 5, 6 near and above the first conveying line 3;

operating each of the two manipulating members 5, 6 to follow the first conveying line 3 with a relative speed substantially zero;

operating each of the two manipulating members 5, 6 to pick up a corresponding pair of articles 2 carried by the first conveying line 3 with a prefixed picking up step P*;

placing each of the two manipulating members 5, 6 near and above the second conveying line 4;

operating each of the two manipulating members 5, 6 to follow the second conveying line 4 with a relative speed substantially zero;

operation of each of the two manipulating members 5, 6 to release the corresponding pair of articles 2 onto the second conveying line 4 with a prefixed release step R*;

with the above manipulating members 5, 6 being operated independently from each other in the corresponding placing, following, picking up and release steps.

For example, the first line 3 and the second line 4 are situated one beside the other and are operated in the same forward direction W1, W2.

Advantageously, the at least two manipulating members 5, 6 move along at least four axes $[(x_1, \omega_1, \alpha_1, z_1), (x_2, \omega_2, \alpha_2, z_2)]$, in order to ensure the correct performing of the above placing, following, picking up and release steps.

According to another embodiment, the transferring method proposed by the invention includes, in step relation with the motion of the manipulating members 5, 6 following the first conveying line 3:

operation of each of the two manipulating members 5, 6 to move close to the first conveying line 3;

operation of each of the two manipulating members 5, 6 to pick up the pair of articles 2 carried by the first conveying line 3 with a picking up step P*;

operating of each of the two manipulating members 5, 6 to move far from the first conveying line 3.

Likewise, according to another embodiment, the transferring method proposed by the invention includes, in step relation with the manipulating members 5, 6 following the second conveying line 4:

operation of each of the two manipulating members 5, 6 to move close to the second conveying line 4;

operation of each of the two manipulating members 5, 6 to release the pair of articles 2 onto the second conveying line 4 with a prefixed release step R*;

operation of each of the two manipulating members 5, 6 to move far from the second conveying line 4.

In accordance with the specific features, the method proposed by the invention allows articles 2 to be released onto the second conveying line 4 in a release configuration R, which is arranged angular with respect to the picking up configuration P, e.g. rotated by 90°, and/or with a picking up step P* different from the release step R*.

As a mere example, the articles 2 are placed aligned longitudinally in the first conveying line 3 and released longitudinally side by side in the second conveying line 4.

The proposed method can be performed independently from the operation way of the first line 3 and the second line 4, with a particular interest for the continuous operation thereof.

It appears obvious from the above description how the proposed method for transferring articles, in particular for pharmaceuticals, cosmetics and/or food, from a first conveying line to a second article conveying line, as well as the apparatus, which carries out the method, can ensure high production rate and flexibility in each operation step, independently from the transferred articles size, from the configuration and/or the step of picking up/release of the articles.

This is ensured by the use of at least two manipulating members, which move along at least four axes, operated independently from each other, in suitable step relation.

This does not forbid the use of more manipulating members, e.g. three manipulating members operated independently.

The release of the articles onto the second conveying line can occur during the dwelling of the latter, in case of stepwise operation, or during the following motion, in case of continuous operation.

In case of stepwise operation, the articles can be released also in the following motion, during the operation of the second conveying line.

The articles picked up from the first conveying line with a prefixed picking up step can be released onto the second conveying line with a release step, which can be the same as or different from the picking up step.

Likewise, the articles picked up from the first conveying line in a prefixed picking up configuration, can be released onto the second conveying line in the same or different release orientation, e.g. rotated by 90°, i.e. counterclockwise.

In particular, the articles can be picked up from the first conveying line in longitudinal alignment, or arranged side by side, and then they can be released onto the second conveying line arranged longitudinally side by side or aligned.

For example, the articles released onto the second conveying line arranged longitudinally side by side can be oriented in the same or different way.

It is understood from the above description that the proposed method, as well as the apparatus for carrying it out, ensures high flexibility and versatility standards in any operation condition, allowing particularly rapid and easy adapting operations, required when the article size is changed, as well as when the orientation and/or step is changed.

It is to be pointed out that the proposed apparatus, which carries out the method proposed by the invention, is extremely functional and ensures particularly rapid and easy installation and maintenance operations.

It is understood that the proposed invention has been described, with reference to the enclosed figures, as a mere, non limiting example. Therefore, it is obvious that any changes or variants applied thereto remain within the protective scope defined by the following claims.

What is claimed is:

1. A method for transferring articles from a first conveying line to a second article conveying line, including:
    placing at least two manipulating members near and above said first conveying line;
    operating each of said manipulating members to follow the first conveying line with a relative substantially zero speed;
    operating each of the two manipulating members to pick up a corresponding pair of articles carried by the first conveying line in a picking up step;
    placing each of the two manipulating members near and above the second conveying line;
    operating each of the two manipulating members to follow the second conveying line with a relative substantially zero speed;
    operating each of the two manipulating members to release the corresponding pair of articles onto the second conveying line in a release step;
    with said at least two manipulating members operated independently from each other, the least two manipulating members, operated independently from each other, being movable along at least four axes in the above placing, following, picking up and release steps.

2. A method, as the claimed in claim 1, including, in step relation with, manipulating members following the first conveying line:
    operating each of the two manipulating members to move close to the first conveying line;
    operating each of the two manipulating members to pick up the pair of articles carried by the first conveying line, in a picking up step;
    operating each of the two manipulating members to move far from the first conveying line.

3. A method, as claimed in claim 1, including in step relation with the manipulating members following the second conveying line:
    operating each of the two manipulating members to move close to the second conveying line;
    operating each of the two manipulating members to release said pair of articles onto the second conveying line in a release step;
    operating each of the two manipulating members to move far from the second conveying line.

4. A method, as claimed in claim 1, including, in step relation with the manipulating members following the first conveying line:
    operating each of the two manipulating members to move close to the first conveying line;
    operating each of the two manipulating members to pick up the pair of articles carried by the first conveying line, in a picking up step;
    operating each of the two manipulating members to move far from the first conveying line;
    and in step relation with the manipulating members following the second conveying line:
    operating each of the two manipulating members to move close to the second conveying line;
    operating each of the two manipulating members to release said pair of articles onto the second conveying line in a release step;
    operating each of the two manipulating members to move far from the second conveying line.

5. A method, as claimed in any claim 1, wherein the picking up step is different from the release step.

6. A method, as claimed in claim 1, wherein the articles are released onto the second conveying line arranged at an angle with respect to the picking up from the first conveying line.

7. A method, as claimed in claim 1, wherein the articles on the first conveying line are longitudinally aligned.

8. A method, as claimed in claim 7, wherein said first conveying line is operated continuously.

9. A method, as claimed in claim 1, wherein the articles on the second conveying line are arranged longitudinally side by side.

10. A method, as claimed in claim 9, wherein said second conveying line is operated continuously.

11. A method, as claimed in claim 1, wherein said first conveying line and said second conveying line are arranged side by side and operated in a same forward direction.

12. An apparatus for transferring articles from a first conveying line to a second article conveying line, including:
    at least two manipulating members for picking up a pair of articles moving along the first conveying line, in a picking up step, and for releasing the picked up pair of articles onto the second conveying line, in a release step and arranged at an angle with respect to the picking up step; said at least two manipulating members being operated independently from each other, the least two manipulating members, operated independently from each other, being movable along at least four axes.

13. Apparatus, as claimed in claim 12, wherein said manipulating members include arms carried, at one end, by corresponding support means and having picking up means at another end for picking up and/or releasing the articles;
    said support means moving horizontally and vertically, respectively to follow and move to/from the corresponding first conveying line and second conveying line;

said arms being articulated to a corresponding support means and rotating with respect to vertical axes, to be placed near said first and second conveying lines:

said picking up means being articulated to the corresponding arms and rotating with respect to relevant vertical axes, to release the articles with an orientation set at an angle with respect to the picking up orientation.

14. Apparatus, as claimed in claim 13, wherein the arms are substantially coplanar.

15. Apparatus, as claimed in claim 13, wherein the arms are operated to move close to or far from each other.

16. Apparatus, as claimed in claim 12, wherein the articles in the first conveying line are longitudinally aligned.

17. Apparatus, as claimed in claim 12, wherein the articles in the second conveying line, are arranged longitudinally side by side.

18. Apparatus, as claimed in claim 12, wherein said first conveying line is operated continuously.

19. Apparatus, as claimed in claim 12, wherein said second conveying line is operated continuously.

20. Apparatus, as claimed in claim 12, wherein said first conveying line and said second conveying line are placed side by side and operated in a same forward direction.

* * * * *